Patented Apr. 9, 1935

1,997,319

UNITED STATES PATENT OFFICE 1,997,319

CELLULOSE ORGANIC ESTER COMPOSITION CONTAINING PINACOL

Henry B. Smith, Rochester, N. Y., assignor to Eastman Kodak Company, Rochester, N. Y., a corporation of New York No Drawing. Application July 18, 1934, Serial No. 735,830

11 Claims. (Cl. 106—40)

This invention relates to compositions of matter in which cellulose organic esters, such as cellulose acetate, are combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, coating compositions and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce compositions of matter which are capable of easy and convenient manipulation in the plastic and analogous arts, such as in the manufacture of sheets, films, artificial silk filaments, varnishes, lacquers and the like, and to produce compositions which will not injure, or be injured by, the substances or surfaces with which they are associated during manufacture. Another object of my invention is to produce compositions which can be molded at elevated temperatures and high pressures to produce plastic products having the desirable properties of celluloid. Still another object of my invention is to produce compositions of matter containing cellulose acetate which have a high degree of flexibility, softness and pliability. Other objects will become apparent to those skilled in the art to which this invention pertains.

While cellulose acetate has been known for decades, it has also been known that to utilize it in the various plastic arts it is necessary to mix therewith various plasticizing or conditioning agents. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetate to prepare it for use in the other plastic arts, such as in the manufacture of lacquers, varnishes, artificial silk filaments, molded compounds and the like. While the plasticizers or other addition agents heretofore discovered have had their utility in the art, the increasing use to which cellulose acetate has been put and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate, and many substances which act as plasticizers for nitrocellulose are not compatible or at least not sufficiently compatible with cellulose acetate to be used as plasticizers in cellulose acetate compositions.

I have discovered that valuable properties may be induced in and/or contributed to compositions containing organic esters of cellulose, such as cellulose acetate, by adding thereto as a plasticizer, a compound selected from the group consisting of pinacol and pinacol hydrate. The particularly useful properties which these compounds induce in or contribute to cellulosic compositions containing them are hereinafter enumerated.

In order that those skilled in this art may better understand my invention I would state, by way of illustration, that for the manufacture of photographic film base or other sheets my new compositions of matter may be compounded as follows: 100 parts of acetone-soluble cellulose acetate, i. e. cellulose acetate containing from about 36% to 42% acetyl radical, approximately, is dissolved with stirring at atmospheric temperature in 300 to 500 parts, preferably 400 parts, by weight, of acetone. To this solution may be added from 10 to 50 parts by weight of pinacol or of pinacol hydrate. Within the limits stated, the amount of plasticizer may be decreased or increased, depending upon whether it is desired to decrease or increase, respectively, the properties which these plasticizers contribute to the finished product. The amount of solvent employed may also be increased or decreased, depending upon whether it is desired to have a more or less freely flowing composition, respectively.

A composition of matter prepared as above described may be deposited upon any suitable film-forming surface and the acetone evaporated therefrom to form a film or sheet, in a manner well known to those skilled in the art. A film so produced has permanently brilliant transparency and low inflammability, burning no more readily than ordinary newsprint. Films or sheets produced in accordance with my invention are very tough and flexible. For instance, films of cellulose acetate plasticized with from 30% to 50% of pinacol (30 to 50 parts by weight per 100 parts by weight of cellulose acetate) had an initial flexibility of from 165% to 300% greater than that of film containing no plasticizer, and films containing from 10% to 50% of pinacol hydrate had an initial flexibility from 135% to 265% greater than that of film containing no plasticizer. Furthermore, film so plasticized maintains flexibility in a superior fashion. For instance, at 65° C., films containing from 30% to 50% of pinacol maintained flexibility for 303 days, and films plasticized with from 10% to 50% of pinacol hydrate maintained flexibility for 389 days, whereas an unplasticized film became brittle in 30 days. This indicates that films or sheets so plasticized will withstand ordinary usage satisfactorily for many years.

Other similar solvents (instead of acetone) which are compatible with the cellulose acetate and my new plasticizers will also occur to those skilled in this art, such as ethylene chloride-alcohol mixtures. In like manner these plasticizers may be compounded with other single organic esters of cellulose, such as cellulose propionate, butyrate, stearate and the like, or with mixed organic esters, such as cellulose aceto-stearate, cellulose aceto-propionate, cellulose aceto-butyrate, cellulose aceto-lactate, cellulose aceto-tartrate or the like, a suitable solvent which will dissolve both the cellulosic derivative and the plasticizer being employed, such, for instance, as an alkylene chloride with or without the addition of alcohol.

Inasmuch as my above-described compositions of matter are useful in the production of films and sheets, it will be apparent that my new plasticizers may also be employed with advantage in the other branches of the plastic art. For instance, my novel plasticizers may be employed in connection with a number of the known lacquer and varnish formulæ with which they may be found to be compatible. In such cases the plasticizer is usually first put into solution in the cellulose derivative solution, and if non-solvents are added for the purpose of cheapening the composition they are added only to such an extent as will not precipitate the derivative from solution. Other uses within the scope of my invention will also suggest themselves to those skilled in the art and are to be included within the scope of the claims appended hereto.

Pinacol and pinacol hydrate may also be advantageously used as plasticizers in cellulose organic ester molding compositions. For instance, when about 30% (30 parts by weight per 100 parts of cellulose acetate) of pinacol is homogeneously mixed with cellulose acetate, the mixture may be converted into a hard, transparent or translucent plastic product by molding at a temperature of 135° C. approximately, and a pressure of 2500 to 4000 pounds per square inch for a period of from 2 to 5 minutes, in a manner already known to those skilled in molding compounds of that nature. When above 30% of pinacol hydrate is homogeneously mixed with cellulose acetate, the mixture may be converted into a hard, transparent or translucent plastic product by molding at a temperature of 125° C., approximately, and a pressure of 2500 to 4000 pounds per square inch for a period of from 2 to 5 minutes.

Moreover, I have found that, upon the addition to cellulose acetate of approximately 100% of pinacol or of pinacol hydrate, quite unexpected compatibility of the plasticizer with the cellulose acetate exists and also that quite unexpected flexibility, plasticity and clarity of the final product result. Contrary to experience in most cases where such a large proportion of plasticizer is used, no exudation or crystallizing out of the plasticizer occurs. While here and in certain of the appended claims I have referred to the use of a plasticizer in approximately equal proportions, namely in a ratio of approximately 100%, it will be understood that within this terminology variations of from 10% to 15% less than 100% of plasticizer and as much as 25% to 50% more than 100% of the plasticizer may in some instances be desirable.

What I claim as my invention and desire to be secured by Letters Patent of the United States is:

1. A composition of matter comprising a cellulose organic ester and a compound selected from the group consisting of pinacol and pinacol hydrate.

2. A composition of matter comprising cellulose acetate and a compound selected from the group consisting of pinacol and pinacol hydrate.

3. A composition of matter comprising cellulose acetate and pinacol.

4. A composition of matter comprising cellulose acetate and pinacol hydrate.

5. A composition of matter comprising 100 parts of cellulose acetate and from 5 to 100 parts, by weight, of a compound selected from the group consisting of pinacol and pinacol hydrate.

6. A transparent, flexible sheet comprising 100 parts of a cellulose organic ester and, as a plasticiser therefor, about 10 to 55 parts, by weight, of a compound selected from the group consisting of pinacol and pinacol hydrate.

7. A transparent, flexible sheet comprising 100 parts of cellulose acetate and, as a plasticizer therefor, about 10 to 55 parts, by weight, of a compound selected from the group consisting of pinacol and pinacol hydrate.

8. A transparent, flexible sheet comprising 100 parts of cellulose acetate and about 10 to 15 parts, by weight, of pinacol.

9. A transparent, flexible sheet comprising 100 parts of cellulose acetate and about 10 to 55 parts, by weight, of pinacol hydrate.

10. A molding composition adapted for molding under elevated temperatures and high pressures, comprising a cellulose organic ester and a compound selected from the group consisting of pinacol and pinacol hydrate.

11. A molding composition adapted for molding under elevated temperatures and high pressures, comprising cellulose acetate and a compound selected from the group consisting of pinacol and pinacol hydrate.

HENRY B. SMITH.